June 15, 1965 W. A. BOCOCK 3,189,342

SORTING APPARATUS

Filed Nov. 26, 1962 2 Sheets-Sheet 1

June 15, 1965 W. A. BOCOCK 3,189,342

SORTING APPARATUS

Filed Nov. 26, 1962 2 Sheets-Sheet 2

3,189,342
Patented June 15, 1965

3,189,342

SORTING APPARATUS

William Arthur Bocock, Coventry, England, assignor to Associated Electrical Industries Limited, London, England, a British company Filed Nov. 26, 1962, Ser. No. 239,878
Claims priority, application Great Britain, Dec. 21, 1961, 45,859
5 Claims. (Cl. 271—64)

This invention relates to sorting apparatus for card-like items (hereinafter referred to generically as cards) and in particular to such apparatus in which a card presented at a display or viewing position can be selectively discharged therefrom to either of two stacks. Sorting apparatus of this kind has application in so-called teaching machines in which answer cards, selected and placed at the viewing position in respect of problems presented by the machine, are required to be selectively discharged from the viewing position into "right" or "wrong" stacks.

One known form of sorting apparatus as used in such a teaching machine comprises a pivoted arrangement having a narrow platform on which a card can be positioned on edge at a viewing position, together with two deflecting members which depend from the platform and slope or curve away in opposite directions from the plane of a positioned card. In operation, the arrangement is tilted about its pivot in one or other direction, so causing the narrow platform to move clear of a card positioned thereon, with the result that the card falls on to the particular deflecting member now beneath it and is guided thereby to one or the other, as the case may be, of two stack positions located on opposite sides of the plane referred to.

As distinct from this known form, card sorting apparatus according to the present invention comprises a mounting and deflecting arrangement having a platform on which a card can be positioned on edge, a first deflecting member which depends from the platform and is inclined (linearly or curvilinearly) so as to intersect the path of a card falling off the platform at one side, a second deflecting member which is inclined in the same general direction as the first and intersects the plane of the positioned card beneath the platform, and means for effecting selective movement of said arrangement to cause displacement of the platform in one direction or the other transverse to said plane, such displacement in the direction generally opposite to that which the deflecting members incline resulting in a card positioned on the platform falling off said side thereof and being intercepted and guided by the first deflecting member towards one stack position, whereas such displacement in the other direction results in the card falling off the other side and being intercepted and guided by the second deflecting member towards another stack position.

By providing in accordance with the invention sorting apparatus in which the deflecting members pertaining to the two stack positions are inclined in the same general direction, both these positions can be located at one side of said plane of a positioned card. As a consequence, where the apparatus is employed for instance in a teaching machine such as hereinbefore considered, there is free space immediately adjacent the plane at its other side which can be utilized to provide a writing surface for a user of the machine. There would be no such free space immediately adjacent the plane with the known form of sorting apparatus referred to because one of the stack positions would occupy it.

In order that the invention may be more fully understood reference will now be made to the accompanying drawings in which, very diagrammatically:

FIG. 1 illustrates the known form of sorting apparatus referred to, and

Figure 1:
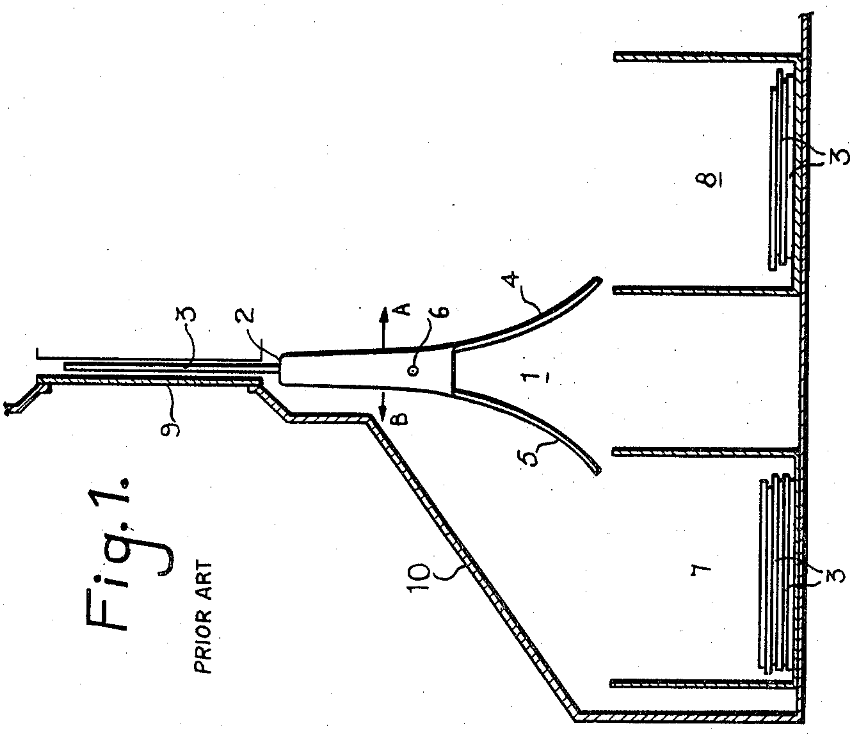
Fig. 1. PRIOR ART

Referring to FIG. 1, the known form of sorting apparatus there shown comprises a mounting and deflecting arrangement 1 having a narrow platform 2 on which a card 3 can be positioned on edge, together with two deflecting members 4, 5 which depend from the platform 2 and curve away in opposite directions from the plane of the positioned card 3. The arrangement 1 is pivoted at a point 6 so that it can be tilted to cause displacement of the platform 2 in either direction A or direction B. When the platform 2 is displaced sufficiently in direction A the card 3 thereon falls on to the deflecting member 5 which guides it towards a stack position 7 located at one side of the plane of the positioned card. On the other hand, when the platform 2 is displaced sufficiently in direction B the card 3 falls on to the deflecting member 4 which guides it towards a stack position 8 located at the other side of the plane of the positioned card. Thus, where this known form of sorting apparatus is incorporated, as indicated, in a teaching machine having a window 9 through which the positioned card 3 can be viewed and a front panel 10 enclosing the stack position 7, the space immediately in front of the plane of the positioned card is occupied by the stack position 7 and the front panel 10 and cannot therefore be utilised as a writing surface for a user of the machine.

Figures 2, 3:
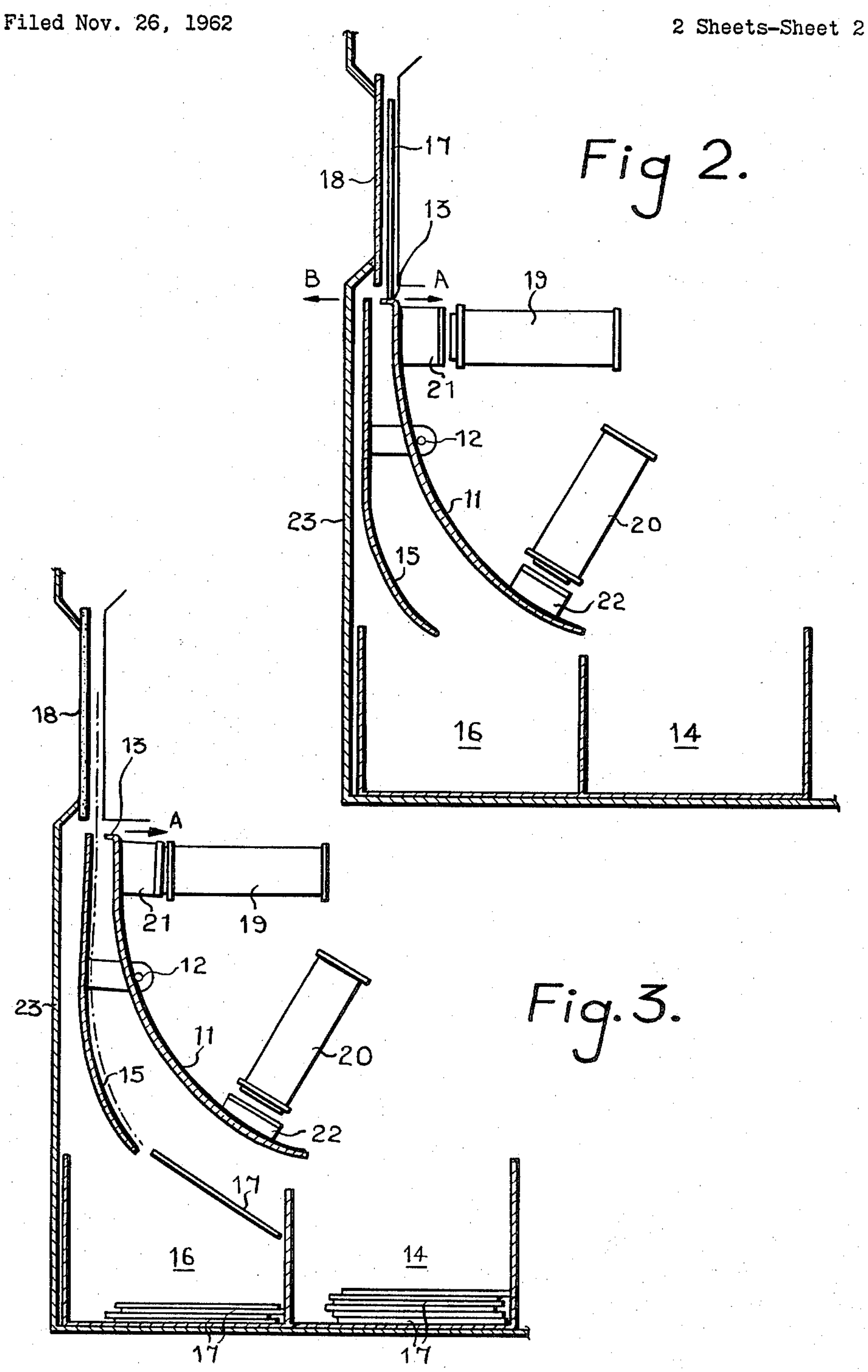

This wastage of space which could otherwise be used to provide a writing surface can be substantially eliminated with sorting apparatus according to the present invention. The embodiment of the invention illustrated in each of FIGS. 2–4 comprises a deflecting member 11 which is pivoted at a point 12 and has its upper end turned over to constitute a narrow platform 13. This deflecting member 11 pertains to a stack position 14 while a second deflecting member 15, depending in the same general direction as the deflecting member 11 and pivotally mounted therewith, pertains to a stack position 16. In FIG. 2 a card 17 is shown positioned on edge on the platform 13 where, assuming as in FIG. 1 that the sorting apparatus is incorporated in a teaching machine, it can be viewed through a window 18.

Figure 4:
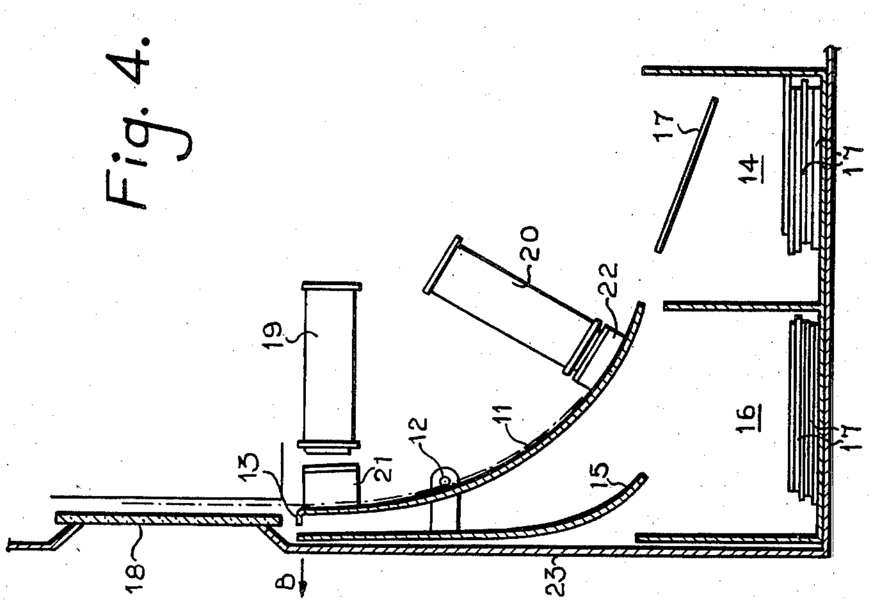
FIGS. 2–4 illustrate by way of example a particular embodiment of sorting apparatus conforming to the invention.

To discharge the card 17 from the platform 13 to the stack position 16, the deflecting member 11 is tilted to cause displacement of the platform 13 in direction A as indicated in FIG. 3. Once the platform 13 has moved clear of the card 17 the latter falls on to the deflecting member 15 which guides it towards the stack position 16. To discharge the card 17 from the platform 13 to the stack position 14, the deflecting member 11 is tilted in the opposite direction to cause displacement of the platform 13 in the direction B as indicated in FIG. 4. In this instance the card 17 falls on to the deflecting member 11 when the platform 13 moves clear of it and is guided by this member 11 towards the stack position 14.

Any suitable means may be employed for effecting tilting of the deflecting member 11, for instance the electromagnetic means shown which comprises two solenoids 19, 20, and associated pole-pieces 21, 22 which latter are secured adjacent opposite ends of the deflecting member 11. Energization of the solenoid 19 attracts the pole-pieces 21 to it so causing the deflecting member 11 to tilt in a clockwise direction to effect displacement of the platform 13 in the direction A, while energization of the solenoid 20 attracts the pole-piece 22 to it, so causing the deflecting member 11 to tilt in an anti-clockwise direction to effect displacement of the platform 13 in the direction B. It is to be appreciated that the pole-pieces 21 and 22 would be secured to the deflecting member 11 in positions which are outside the fall-path of a card.

With the sorting apparatus according to the invention it will be seen that front panel 23 of the teaching machine can be almost co-planar with the plane of a positioned card (17), so that there is free space almost immediately to the front of said plane which can be utilized to provide a writing surface.

What I claim is:

1. Card sorting apparatus comprising a mounting and deflecting arrangement having a platform on which a card can be positioned on edge, a first deflecting member which depends from the platform and is inclined so as to intersect the path of a card falling off the platform at one side, a second deflecting member which is inclined in the same general direction as the first and intersects the plane of the positioned card beneath the platform, and means operable by a viewer for effecting movement of said arrangement to cause displacement of the platform in one direction or the other transverse to said plane as required, such displacement in the direction generally opposite to that which the deflecting members incline resulting in a card positioned on the platform falling off said one side thereof and being intercepted and guided by the first deflecting member towards one stack position, whereas such displacement in the other direction results in the card falling off the other side and being intercepted and guided by the second deflecting member towards another stack position.

2. Card sorting apparatus as claimed in claim 1 wherein said second deflecting member forms part of said mounting and deflecting arrangement.

3. Card sorting apparatus as claimed in claim 1 wherein said mounting and deflecting arrangement is pivotally mounted for tilting movement effective to produce said displacement of the platform.

4. Card sorting apparatus as claimed in claim 1 employing electromagnetic means for effecting said movement of said mounting and deflecting arrangement.

5. Card sorting apparatus comprising a first deflecting member pivotally mounted at an intermediate position along its length and having at its upper end a platform on which a card can be positioned on edge, this deflecting member being inclined so as to intersect the path of a card falling off the platform at one side, a second deflecting member spaced from and pivotally mounted with the first deflecting member and inclined in the same general direction thereas to intersect beneath the platform the plane of a positioned card, a first electromagnet operable to cause the deflecting members to be tilted in one direction sufficiently to displace the platform so that a positioned card will fall off one side thereof and be intercepted and guided by one of the deflecting members towards one stack position, and a second electromagnet operable to cause tilting in the opposite direction sufficiently for the card to fall off the other side of the platform and be intercepted and guided by the other deflecting member towards another stack position.

References Cited by the Examiner

UNITED STATES PATENTS

| | | | |
|---|---|---|---|
| 469,004 | 2/92 | Woodward | 271—34 |
| 888,343 | 5/08 | Molyneux | 271—64 X |

ROBERT B. REEVES, *Primary Examiner.*

SAMUEL F. COLEMAN, *Examiner.*